Nov. 18, 1941.   E. F. HOWE   2,263,359
MODEL TRAINING AIRPLANE
Filed April 8, 1940   6 Sheets-Sheet 1
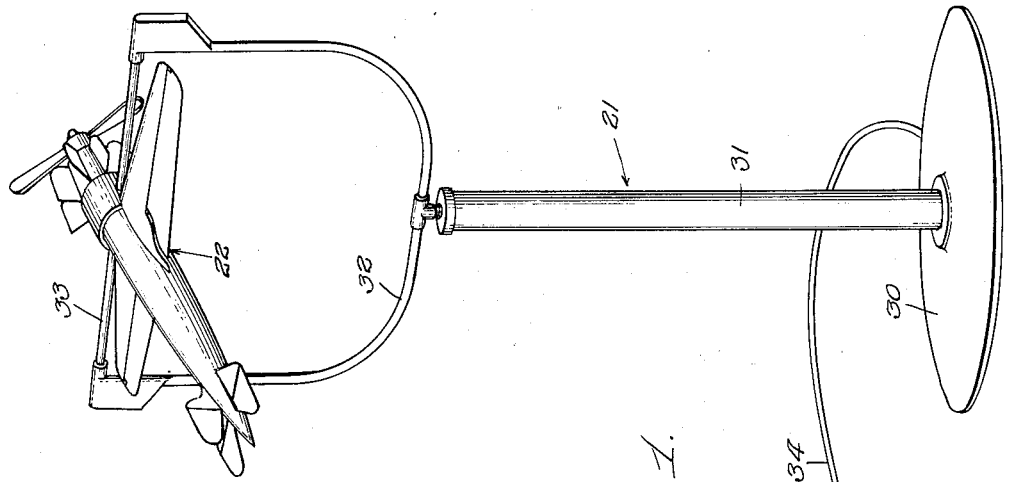
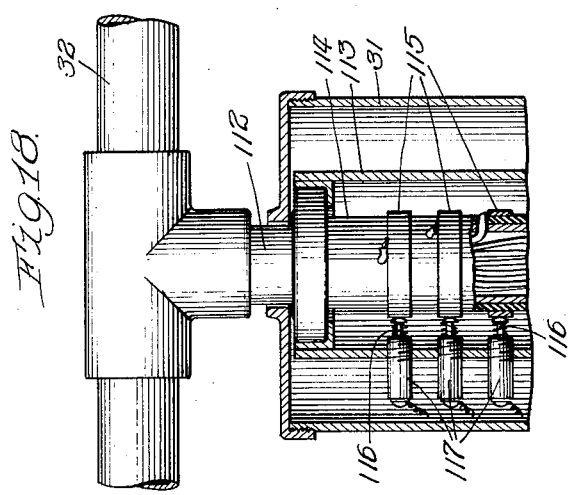
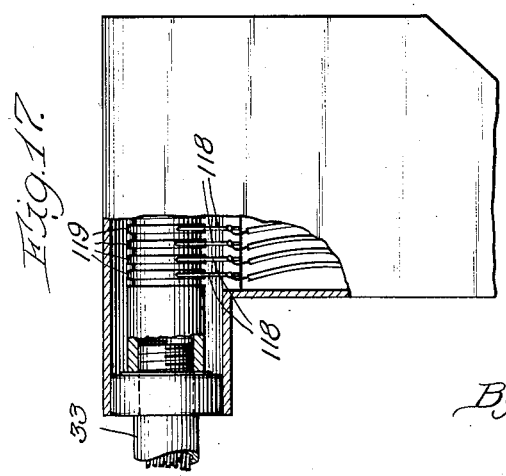
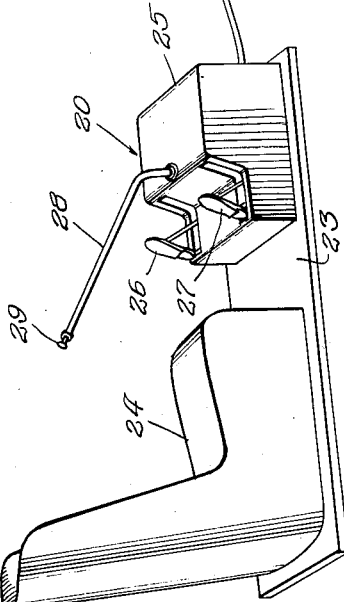
Inventor:
Elra F. Howe,

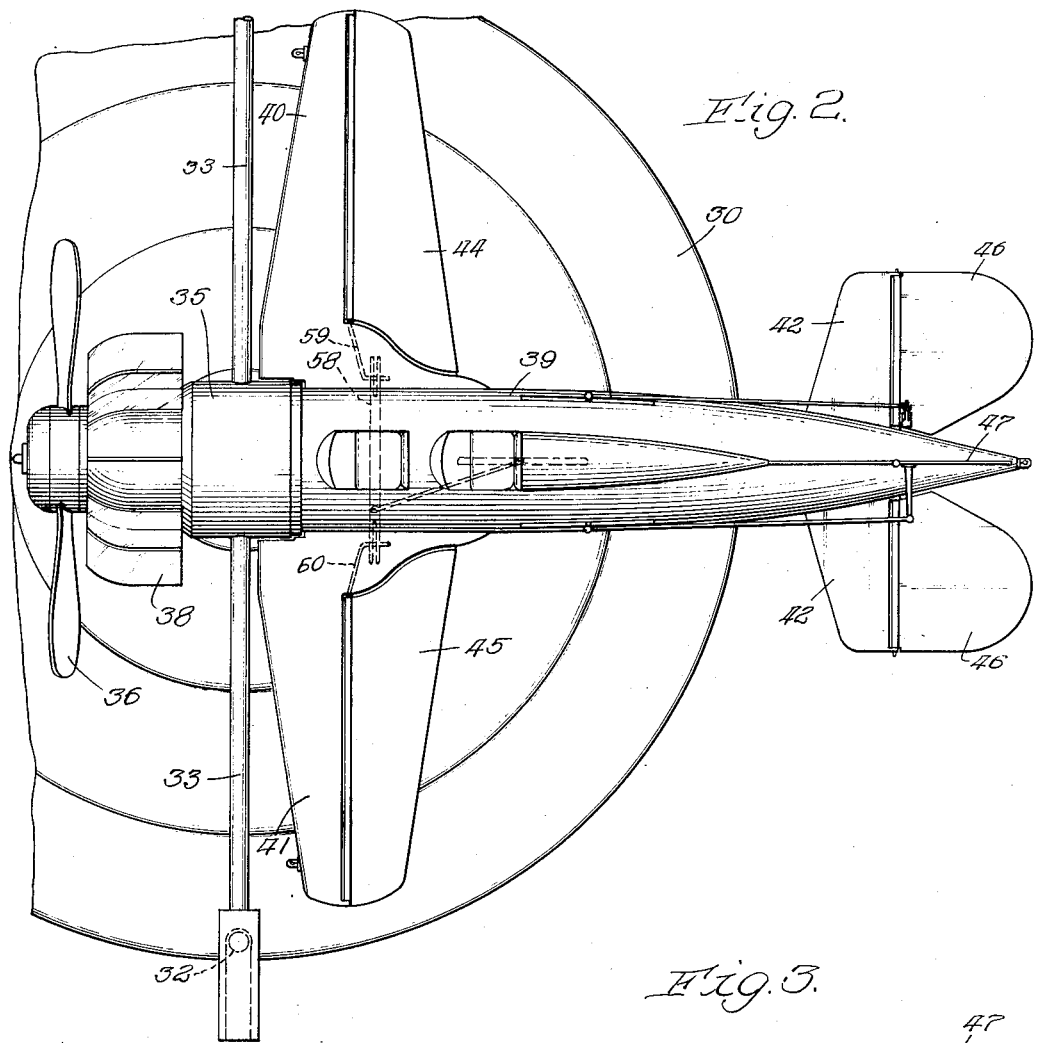
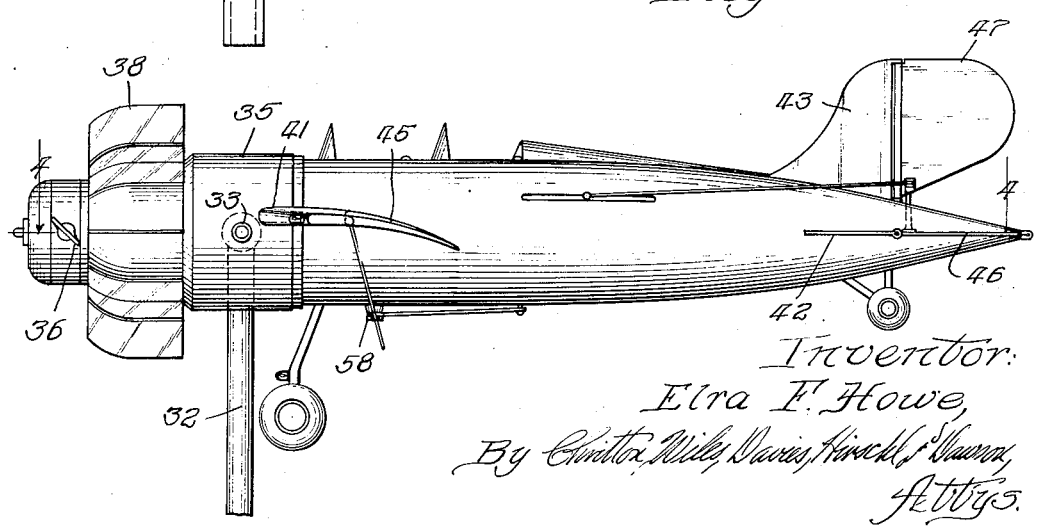

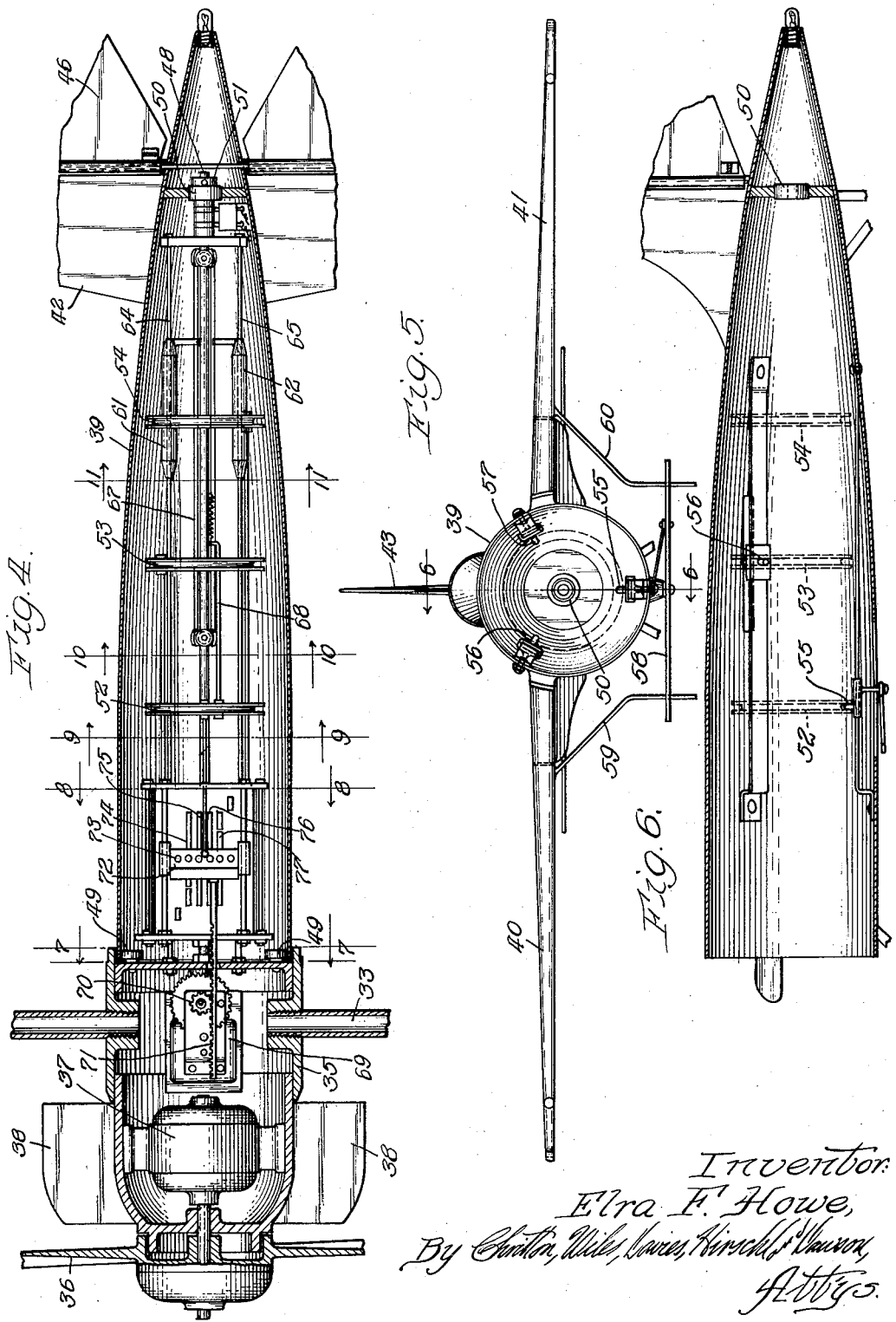

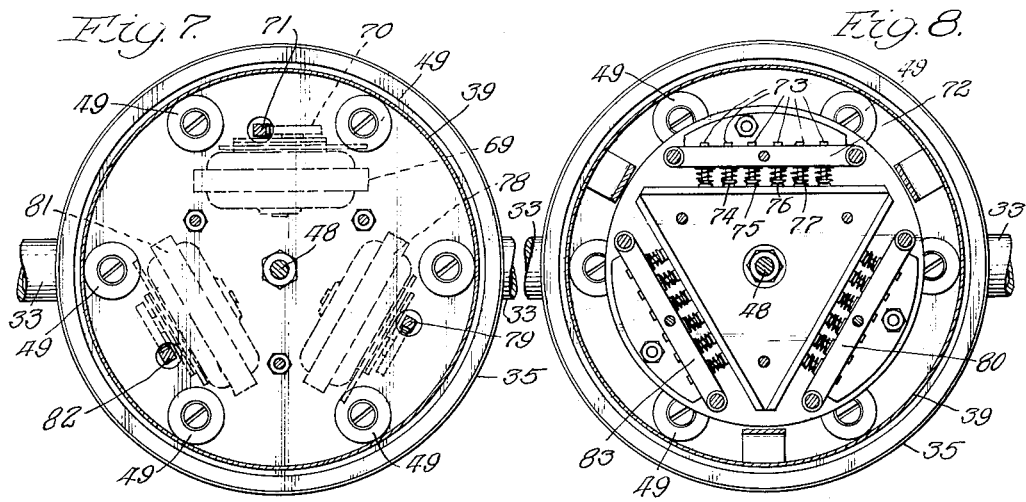
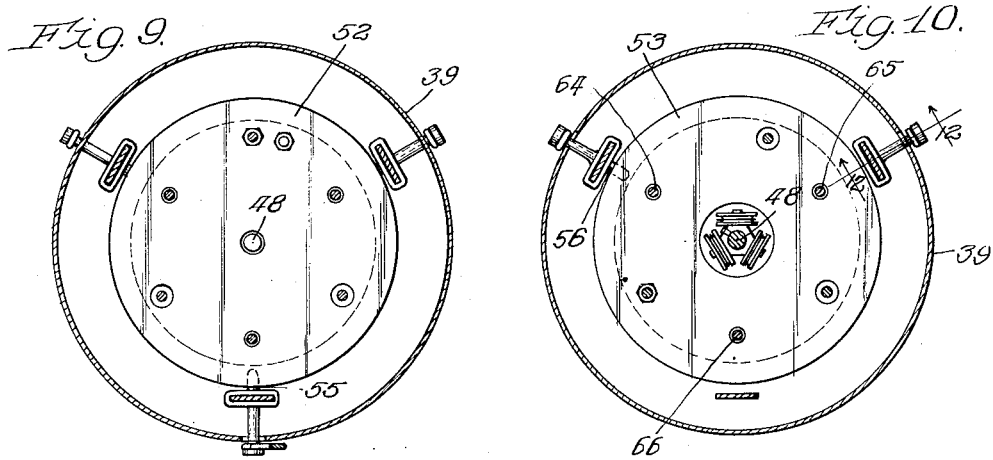
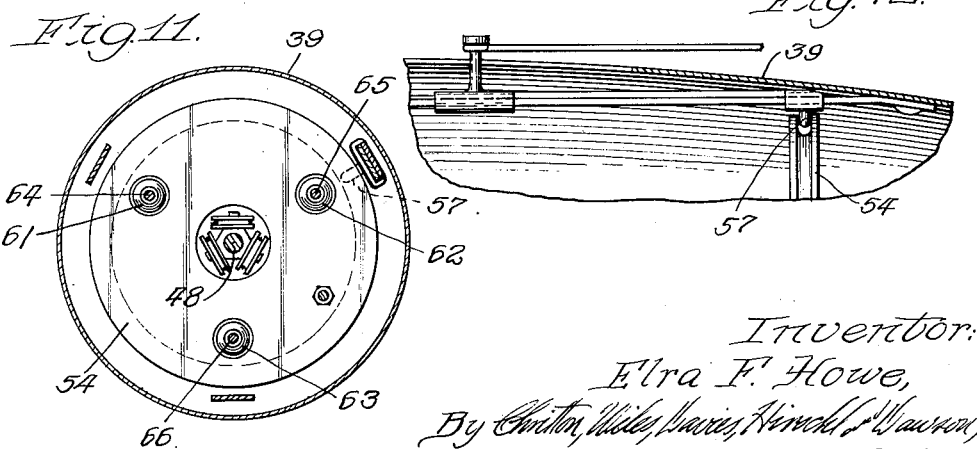

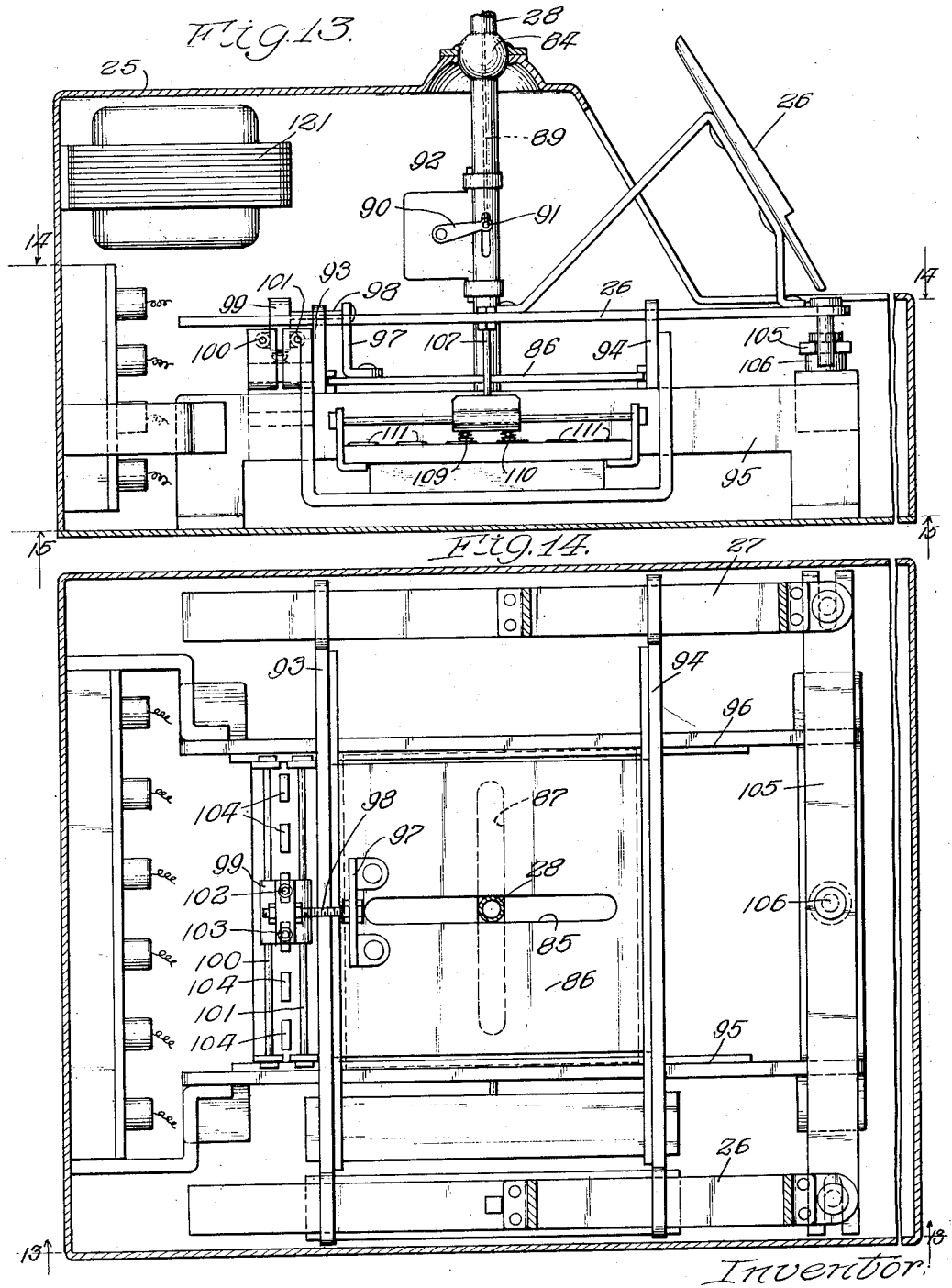

Nov. 18, 1941.  E. F. HOWE  2,263,359

MODEL TRAINING AIRPLANE

Filed April 8, 1940  6 Sheets-Sheet 6

Inventor:
Elra F. Howe,

Patented Nov. 18, 1941

2,263,359

UNITED STATES PATENT OFFICE 2,263,359

MODEL TRAINING AIRPLANE

Elra F. Howe, Chicago, Ill.

Application April 8, 1940, Serial No. 328,589

10 Claims. (Cl. 35—12)

This invention relates to a model airplane and more particularly to a plane designed to perform the evolutions of a natural plane under the guidance of an operator handling conventional controls.

Figure 15:
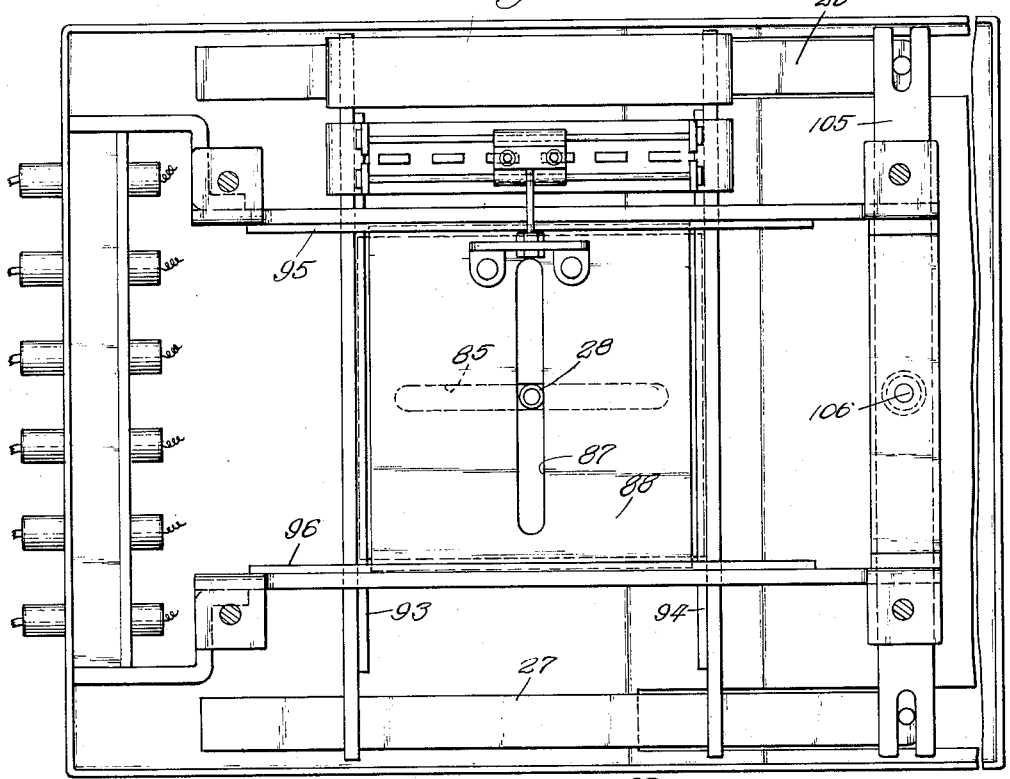
Figure 16:
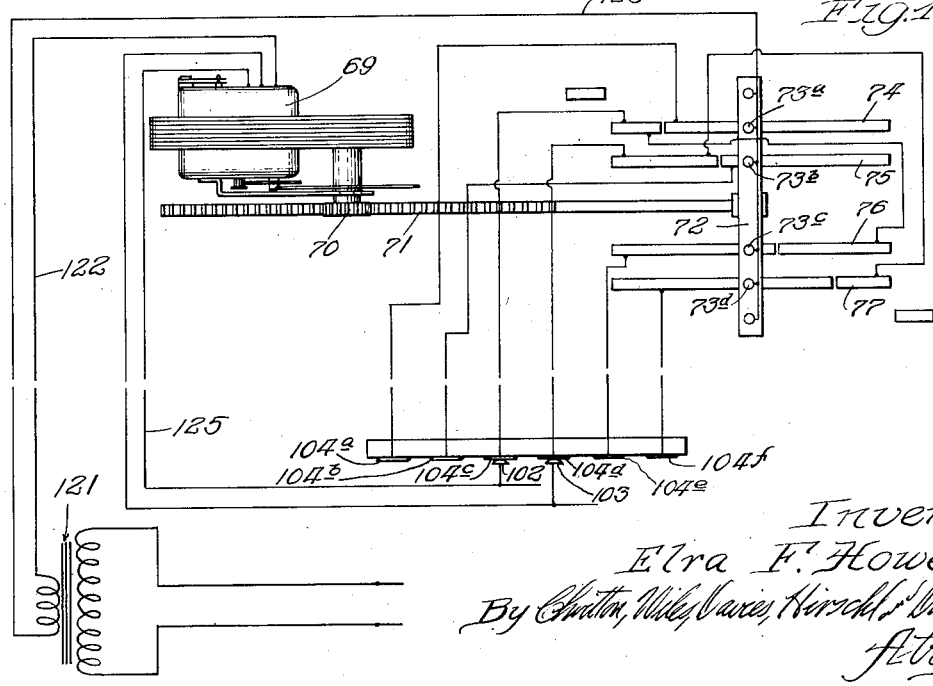

One feature of this invention is that the plane is mounted in a manner which permits apparent universal movement; another feature of the invention is that desired movements of the controlled elements of the plane (as for example the ailerons) are effected by movement of conventional controls at a point spaced from the model plane; still another feature is that movements of the plane are effected by interaction of its control surfaces with a moving air stream, rather than by mere mechanical movement of the plane body; a further feature of this invention is that, insofar as movement about one axis is concerned, the plane gives the effect of moving in its entirety, whereas actually only a portion thereof moves; another feature is that all control impulses are delivered to the plane electrically; yet another feature is that undesired friction is reduced to the minimum; a further feature is that the arrangement of and interaction between the controls and the control surfaces is such that both simulate very realistically the movement and action of similar parts in an actual plane; other features and advantages of this invention will be apparent from the following specification and the drawings, in which:

Figure 1 is an elevation of apparatus embodying my invention; Figure 2 is a partially broken-away top plan view of the standard and plane; Figure 3 is a side elevation of the plane shown in Figure 2; Figure 4 is a longitudinal view with the fuselage of the plane broken away and in cross-section, along the line 4—4 of Figure 3; Figure 5 is a view (looking toward the tail) of the rear or aft shell portion of the fuselage, removed from the remainder of the apparatus; Figure 6 is a longitudinal sectional view of the shell portion of the fuselage, along the line 6—6 of Figure 5; Figure 7 is a transverse sectional view along the line 7—7 of Figure 4, looking forward; Figure 8 is a transverse sectional view along the line 8—8 of Figure 4, looking forward; Figure 9 is a transverse sectional view along the line 9—9 of Figure 4, looking to the rear; Figure 10 is a transverse sectional view along the line 10—10 of Figure 4, looking to the rear; Figure 11 is a transverse sectional view along the line 11—11 of Figure 4, looking to the rear; Figure 12 is a fragmentary view, partly in section, showing some of the details of the connection between the driving means and a control surface, the rudder in this case; Figure 13 is a view of the control assembly with the housing in vertical section; Figure 14 is a horizontal sectional view of the control assembly, along the line 14—14 of Figure 13; Figure 15 is a horizontal sectional view, along the line 15—15 of Figure 13, looking upward; Figure 16 is a simplified schematic diagram of one set of controls; Figure 17 is a fragmentary detail view, partly in section, of one end of the yoke supporting the plane; and Figure 18 is a view, principally in vertical section, of the juncture of the stand upright and the yoke.

Various apparatus and methods have heretofore been devised for causing a model plane to make certain desired movements, or for providing the simulation of a cockpit, with its controls. I have devised and am here disclosing and claiming, however, apparatus wherein movement of the controls actuates controlled elements upon a model plane; and wherein the resultant movements of the model plane are effected by interaction between its control surfaces and a moving air stream. The result is apparatus which enables an operator, whether it be for training purposes or for amusement, to make certain movements of the controls and to see before him movements of a plane take place which exactly simulate movements which would have taken place in a real plane if he had made those same control movements therein.

In the particular embodiment of my invention illustrated herewith (referring first to Figure 1) it will be seen that I provide a cockpit arrangement, indicated in general as 20, which simulates that portion of a real plane; a stand indicated in general as 21, spaced a few feet from the cockpit arrangement but clearly within the view of an operator; and a model plane, indicated in general as 22, mounted on a stand for apparent universal movement, the plane 22 having its various elements connected with the controls in the cockpit arrangement.

Referring now more particularly to the cockpit arrangement 20, it is here illustrated as including a base 23, adapted to be placed on a floor or other surface, carrying a seat 24. In front of the seat is mounted a housing 25 on which are mounted left and right rudder pedals 26 and 27, and a control or joy stick 28. The joy stick is capable of universal movement, and has a throttle button 29 slidably mounted in its upper end. The housing contains apparatus (which will be described more fully hereafter)

for converting mechanical movement of the controls into electrical impulses.

The stand 21 includes a base 30, an upright or outer supporting tube 31, a yoke 32 rotatable about a vertical axis, and a cross shaft 33 mounted at the upper end of the yoke arms for rotation about a horizontal axis. The model plane 22 is carried by the cross shaft 33 in a manner which will be hereafter more fully described. Electrical impulses from the control housing 25 are delivered through wires in the cable 34, and wires and slidable connections in the stand 21, to the plane; and they are here reconverted, as by small motors, into mechanical movement of the various movable elements of the plane.

Referring now more particularly to Figures 2 to 6, it will be seen that the fuselage or body of the plane is divided into two principal portions. The forward portion 35 is rigidly mounted on the cross shaft 33, which will be seen from Figure 4 to comprise two separate sections threaded into this forward portion of the plane body. The front of this is formed to resemble the front of a plane, with its usual motor cowl, and the cowling and propeller blades 36 mounted thereon are rotatably driven by a power motor 37. Around the motor housing, and radially projecting therefrom, are a plurality of vanes 38. These vanes prevent undesired rotation of air moving backward from the propeller blades 36, and provide a straight blast of air for interaction with the ailerons and the rudder and elevator control surfaces. These vanes are of transparent material in order to detract as little as possible from the desired illusion of a conventional plane on reduced scale.

The rear portion of the fuselage, here identified as 39, is a shell carrying the wings, the stabilizers, the control surfaces, and part of the connecting linkage for movement thereof. As may be best seen in Figures 2, 3 and 5, the fuselage shell 39 has rigidly mounted thereon right and left wings 40 and 41; horizontal stabilizers, here indicated as 42; and a vertical stabilizer 43. The wings have pivotally mounted thereon ailerons 44 and 45; the horizontal stabilizers have elevator control surfaces pivotally mounted thereon, these surfaces here being indicated as 46; and a rudder 47 is pivotally mounted on the vertical stabilizer 43. Other auxiliary equipment simulating that of a real plane is also present, as for example main and tail landing wheels, cockpit cowling, riding lights, and the like.

The rear portion of the plane, as may be best seen in Figures 4 and 7, is rotatably mounted on the forward portion of the plane so as to be rotatable about an axis longitudinal of the plane. The forward portion of the plane has a large amount of control equipment extending rearwardly therefrom within the rear portion of the fuselage, all of this equipment being fixedly mounted (although certain parts have movement with respect to other parts) on the forward portion of the plane. The heart of this mounting is a central rod or shaft 48. The forward edge of the rear shell portion 39 is rotatably carried by rollers 49; and the rear portion is carried and kept in alignment by a ball bearing 50 held in place on the back end of the rod member 48 by a collar 51. Removal of this collar enables the whole rear portion of the plane to be slipped off backwardly to enable adjustment or repair of the control mechanism housed therein, although carried by the forward portion of the plane, as mentioned above.

Mounted in the fuselage in such a manner as to be longitudinally movable but non-rotatable therein are three pulley-like members 52, 53 and 54. These are round members with peripheral channels or grooves designed to receive, respectively, pins 55, 56 and 57. Each of these pins is connected to a control surface, and longitudinal movement of the members, in response to action which will be hereafter more fully described, effects desired movements of the control surfaces without in any way impeding rotation of the rear portion of the plane. The forward member 52 controls movement of the ailerons 44 and 45, the connecting linkage being such that, in accordance with conventional airplane practice, one aileron moves up as the other moves down, and vice versa. The pulley-like member 53, the central member, controls the elevators 46; and the rear member 54 controls the rudder 47. In the case of the rear control surfaces the connection is a positive one, all joints being pivotally connected to each other; but in the case of the connection to the aileron one part of the linkage, the cross arm 52 pivotally mounted at its center, has slots in each end thereof in which arms 59 and 60, rigidly connected to the ailerons 44 and 45, move. It will thus be seen that any desired movement of the control surfaces can be effected, without regard to their position or rotation with respect to the forward part of the plane, by movements of the pulley-like members 52, 53 and 54 longitudinally of the plane; and that whenever any of these members is stationary the control surface to which it is linked will similarly be stationary at a corresponding position.

In order to maintain the balance of the plane, which is necessary if the plane is to perform desired evolutions merely upon interaction of its control surfaces with a moving air stream, some means must be provided for neutralizing the shift of weight in the plane upon movement of these pulley-like control members. I accomplish this by providing counter-balances or weights 61, 62 and 63 longitudinally slidable on rods 64, 65 and 66. In order to make as compact an arrangement as possible, these are slidable through openings in the pulley-like member, as may be best seen in Figure 11. Three sets of endless belts (here in the form of cord with a spring to maintain the desired tension) pass around forward and rear pulleys. One such endless belt is indicated in Figure 4 as 67, and it is connected at one point to the weight 61 and at another point, here by the rod member 68, to the pulley-like member 52. The arrangement is such that rearward movement of the member 52 causes forward movement of the weight 61, and vice versa. This maintains the desired balance of the plane despite movements of the control elements. The weight of the counterbalance weight 61 must be such as to not only equal the effective weight of the pulley-like member 52, but also that of a rack bar and contact elements which are rigidly connected to and move with it.

It will be understood that not only the counterbalancing arrangement but also the drive arrangement for each of the three pulley-like members duplicate each other, and therefore only one drive arrangement will be described in detail. Referring now more particularly to Figures 4, 7 and 8, it will be seen that there is a small control motor which effects movement of the member 52, motor 69, and this and its associated parts will be described in detail as an example of each of the control arrangements. The motor 69 is of the reversible type, and is connected through reduction gearing to a pinion 70. This pinion cooperates with a rack bar 71, so that rotation of the motor in either direction effects movement of the rack bar toward the front or the rear of the plane. The rack bar has a contact element 72 rigidly connected to it and movable with it; and is also rigidly connected to the pulley-like member 52 to drive it.

The contact element 72 has transversely arranged across it a plurality of spring-pressed contact pins or fingers 73 which interact with commutator strips, as 74, 75, 76 and 77. These commutator strips are split at different points in their length, and the control circuit to the motor 69 is completed through the fingers 73 and their various cooperating commutator strips in such a manner that when the circuit is completed through a given portion of a commutator strip the rack bar moves until the contact finger stands on another portion of the commutator strip which is not in circuit at the time. As many positions of the control surface are thus provided as there are commutator strips, one position corresponding, in each case, to the electrically dead or open circuit position in the given arrangement of commutator strips.

As in the case of the other equipment described heretofore, this actuating arrangement is duplicated for each of the control surfaces. As may be best seen in Figures 7 and 8, the further motor 78 drives the rack bar 79 and the movable contact-holding member 80; and the motor 81 drives the rack bar 82 and the movable contact-holding member 83. In the case of each of the control surfaces, therefore, completion of a circuit to the motor through a given contact finger and one side of the cooperating contact strip causes movement of the control surface to a predetermined position. Should the inertia of the motor, or pressure of air on the control surface, cause the contact finger to over shoot the open circuit position between the parts of the contact strips, its engagement with another energized portion of the contact strips causes reverse operation of the motor to insure that the control surface will move to and remain at the desired position until the operator has moved the controls to effect some desired change in the control surfaces.

Turning now to the assembly for effecting certain desired circuit connections upon movement of the controls, reference is had particularly to Figures 13, 14 and 15. The joy stick 28 has a ball portion mounted in a socket 84 for universal movement, as mentioned heretofore, and its lower end passes through a slot 85 in the plate 86 and a transverse slot 87 in another plate 88 immediately beneath this. A flexible cable or wire 89 extends downwardly from the button or throttle member 29, and is connected to an arm 90 by a pin 91. The arm 90 controls the setting of a rheostat in the housing 92, this rheostat being in the circuit of the main or propeller drive motor 37. Control of the speed of rotation of the propeller may be thus readily effected to control the rate of reaction (i. e., the apparent speed) of the plane on the stand.

The plates 86 and 88 are slidable in and on a plane in a direction transverse to that of the slots. The plate 86, for example, is slidable in an up and down direction (speaking with respect to Figure 14) in channels in the brackets 93 and 94. The plate 88, shown in Figure 15, is slidable in a direction transverse to this in the bracket members 95 and 96.

Each of these plates, as may be seen in Figures 14 and 15, has mechanically connected to it for movement with it a contact-holding member. Inasmuch as these duplicate each other, only one will be described in detail. Plate 86 is mechanically connected, as by the bracket 97 and threaded rod 98, to the contact-holding member 99 slidable on the rods 100 and 101. A pair of contact fingers 102 and 103, carried on the member 99, are spring-pressed downwardly to engage contact segments or sectors 104 in an insulating block beneath them.

The foot pedals 26 and 27 are slidably rather than pivotally mounted in the housing; and the pedal 26 is connected to the pedal 27 through a link or lever 105 pivoted at 106. Inward movement of one pedal thus effects outward movement of the other pedal, and vice versa. One of the pedals, in this case shown as the pedal 26, is also connected to contact fingers to effect desired circuit connections. This may be best seen in Figure 13, where the pedal 26 is shown connected by the rod 107 to the slider 108, carrying the downwardly spring-pressed contact fingers 109 and 110 designed to cooperate with contact segments or sectors 111. Movement of the foot pedals thus effects changes in the circuit connections in the control arrangement for the rudder; whereas one of the plates, as 86, controls the position of the ailerons and the other plate, as 88, controls the position of the elevator control surfaces.

In order to effect the desired circuit connections between the control segments and contact fingers in the control housing and the contact segments, fingers, and motors in the plane, a large number of pairs of wires are carried through the cable 34 to the plane. As may be best seen in Figure 18, the yoke 32 is carried by a tube 112 rotatable within the tube 31, a tube 113 of insulating material lying between the two. An insulating sleeve 114 is forced onto the tube 112 where, as here, that tube is of metal. The insulating sleeve 114 carries a plurality of metal rings 115, and the insulating tube 113 carries a plurality of contact fingers 116 which are slidable in sleeve mountings 117 and spring-pressed into engagement with the rings. In this manner any desired number of connections coming into the base through the cable 34 are completed to wires running up through the tube 112 into the yoke 32, without preventing rotation of the yoke, and without presenting any great amount of friction during such rotation.

A somewhat similar, although mechanically different, arrangement is used at the junction of the yoke with the transverse rod 33, as may be best seen in Figure 17. Here the wires each terminates in spring metal fingers 118, insulated from each, and each engaging a slip or contact ring 119 on an insulating sleeve on the metal cross shaft 33. Wires in the shaft are connected to these rings, and thus connection from the control housing is completed to the elements in the plane without preventing movement of the plane in space.

Because of the plurality of different controls, and the large number of control surface positions desired to give realistic action to the plane, a large number of circuits are provided. These various circuits are in each case, however, duplicates of a fundamental circuit; and a simplified circuit arrangement as applied to one set of controls and one control surface is shown in Figure 16. This may be considered to be an example of the control circuit for the ailerons; and to correspond to portions of the arrangement in the plane and in the control housing.

In the position of the parts shown in Figure 16 no circuit through the motor 69 is completed, and the ailerons would remain stationary. Should the operator desire to cause the plane to tilt in one direction, however, movement of the joy stick in that direction would cause movement of the contact fingers 102 and 103, mechanically but not electrically locked together. Assuming that the movement of these contacts was to the left in Figure 16, 102 would then contact 104b and 103 would contact 104c. The common binding post of the motor 69 is always connected to one side of the secondary of the transformer 121 by the wire 122; and under these conditions the other side of the secondary would be connected through the wire 123, the contact finger 73b, the righthand half of the contact segment 75, the wire 124, the contact segment 104b, the contact finger 102, and the wire 125 to one of the other binding posts of the motor. The motor 69 would thereupon operate in a direction effecting movement of the rack bar 71 to the left, in this case, until the contact finger 73b runs off the end of the right half of the contact segment 75, whereupon the circuit would be broken and the movement of the motor would stop. Since the rack bar 71 is connected to the pulley-like member 52, this movement would effect a change in the position of the ailerons. Moreover, they would stay in a position corresponding to this position of the joy stick until the stick was moved to another position, whereupon movement of the fingers 102 and 103 into engagement with other segments 104 would complete other circuits to cause either further movement of the ailerons in the same direction, or movement back toward a neutral position.

The other control surface movements are effected by similar circuits. That is, a similar arrangement effects movement of the rudder upon movement of the pedals; and movement of the elevator control surfaces upon forward or back movement of the joy stick, through movement of the plate 88 and its associated contacts. While the circuit arrangement and control segments are shown in relatively simple form, the steps in the movement of the various control surfaces can be made as small as desired by increasing the number of contact fingers and cooperating segments or sectors both in the plane and in the control housing. The circuit to the propeller drive motor 37 is of a very simple type which it was not thought necessary to illustrate, a source of power merely being in series with the rheostat and this motor. The rheostat is preferably so arranged that when the throttle member 29 is in its uppermost position (it is spring urged in this direction) the rheostat arm will be off the end of its cooperating wire and the circuit to the main drive motor will be broken; it is also preferably so arranged that the maximum amount of resistance will be in the circuit when it is first made by initial downward movement of the throttle button 29, there being less and less resistance in the circuit as this button is pushed further down.

While I have described and shown certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described, including: a model plane including front and back parts and having movable control surfaces; means for causing a flow of air over said surfaces; a mounting for supporting the plane while permitting movement thereof about a vertical and a transverse axis, the back part being carried by the front part and rotatable with respect thereto about a longitudinal axis; a full size control assembly spaced therefrom; means in the assembly for converting mechanical movements of the controls therein into electrical impulses; means in the plane for converting electrical impulses into mechanical movements of the control surfaces; and circuit connections between the control assembly and the plane, whereby movements of controls in said assembly effect movements of the control surfaces to effect, by their interaction with the moving air, movements of the plane, the movements of the control surfaces and of the plane as a whole simulating movements in a real plane upon the same movements of the controls.

2. Apparatus of the character claimed in claim 1, wherein the electrical interconnecting means of the mounting includes a plurality of pairs of interconnected parts rotatable with respect to each other, one of each of said pairs of parts having a plurality of metal rings thereon and the other part having thereon a plurality of contact elements yieldingly engaging the rings, the connections to the plane being completed through said rings and elements.

3. A model plane of the character described, including: a forward portion; a rear portion rotatably mounted on the forward portion for rotation about the longitudinal axis of the plane, the rear portion carrying all of the wings and at least one movable control surface; motor means carried by the forward portion; and a connection between the motor means and the control surface completed through a ring concentric with the longitudinal axis of the plane and movable therealong.

4. Apparatus of the character described, including: a model plane having movable control surface elements; motor means in the plane for moving at least one of said elements; switch means in the plane having a part movable in accordance with movement of the element and another contacting part; a mounting for supporting the plane while permitting universal movement of the control surfaces thereof; a full size control assembly having movable controls; switch means in the control assembly having a part movable in accordance with movement of a control and another contacting part; a source of electrical power; and a circuit connecting the source with the motor means, the circuit being completed through both the switch means.

5. Apparatus of the character claimed in claim 4, wherein there are a plurality of motor means and cooperating switches in the plane, of switches in the control assembly, and of connecting circuits, one of each of said elements comprising the actuating means for a control surface.

6. Apparatus of the character claimed in claim 4, wherein each of the switches has a plurality of contact segments on one of the parts corresponding respectively with a plurality of positions of the control surface operatively associated with the switch.

7. Apparatus of the character described, including: a miniature plane having movable control surface elements; a mounting for supporting the plane while permitting universal movement of at least that portion including the wings and control surface elements; a full size control assembly spaced therefrom; and means interconnecting the control assembly and the plane, whereby movements of controls in said assembly effect movements of said elements.

8. Apparatus of the character described, including: a model plane including front and back parts and having movable control surfaces; means for causing a flow of air over said surfaces; a mounting for supporting the front part of the plane while permitting movement thereof about a vertical and a transverse axis, the back part being carried by the front part and rotatable with respect thereto about a longitudinal axis to have full universal movement, the front part carrying a motor and the back part carrying the control surfaces; a full size control assembly spaced therefrom; and means interconnecting the control assembly and the plane, whereby movements of controls in said assembly effect movements of the control surfaces to effect, by their interaction with the moving air, movements of the plane.

9. Apparatus of the character claimed in claim 8 including radially arranged substantially invisible vanes ensuring a straight flow of air across the control surfaces without substantially detracting from the realistic appearance of the model plane.

10. Apparatus of the character described, including: a support; means carried by the support and rotatable in one plane; means carried by the first mentioned means and rotatable in another plane; and a miniature airplane having forward and rear portions rotatable with respect to each other about the longitudinal axis of the airplane, the forward portion including drive motors and being attached to the second mentioned means, the rear portion carrying all of the wings of the airplane, being hollow, and surrounding substantially all the movable drive elements connecting the motors and control surfaces, these elements being carried by and extending rearwardly of the forward portion.

ELRA F. HOWE.